US005873169A

United States Patent [19]

James et al.

[11] Patent Number: 5,873,169

[45] Date of Patent: Feb. 23, 1999

[54] BLADE GUARD STOP FOR A CIRCULAR SAW

[75] Inventors: Thomas Paul James, Oconomowoc; Jeffrey Scott Holly, Menomonee Falls, both of Wis.

[73] Assignee: Milwaukee Electric Tool Corporation

[21] Appl. No.: 882,552

[22] Filed: Jun. 25, 1997

[51] Int. Cl.[6] .......... B23D 47/00; B27G 19/04

[52] U.S. Cl. .......... 30/391; 30/376

[58] Field of Search .......... 30/390, 391, 388, 30/376; 83/478

[56] References Cited

U.S. PATENT DOCUMENTS

| | | | |
|---|---|---|---|
| 950,994 | 3/1910 | Burbank . | |
| 1,738,896 | 12/1929 | Hansen . | |
| 1,811,577 | 6/1931 | Crowe . | |
| 1,813,231 | 7/1931 | Crowe . | |
| 1,830,580 | 11/1931 | Wappat . | |
| 1,900,553 | 3/1933 | Hampton . | |
| 2,061,707 | 11/1936 | Kleiman et al. . | |
| 2,072,750 | 3/1937 | Hampton | 30/391 |
| 2,828,784 | 4/1958 | Damijonaitis | 30/391 |
| 2,963,056 | 12/1960 | Rickford | 30/391 |
| 3,733,701 | 5/1973 | Lubas | 30/391 |
| 3,922,785 | 12/1975 | Fushiya | 30/391 |
| 4,693,008 | 9/1987 | Velie | 30/390 |

*Primary Examiner*—Hwei-Siu Payer
*Attorney, Agent, or Firm*—Michael Best & Friedrich LLP

[57] ABSTRACT

An improved blade guard stop for a circular saw. The circular saw includes a saw blade driven by a motor for rotation about an axis, a blade guard rotatable about the axis between a covered position, in which the saw blade is covered, and an uncovered position, in which the saw blade is exposed, a biasing member biasing the blade guard toward the covered position, and a flexible spring member to absorb the rotational force of the blade guard and to absorb the biasing force of said biasing member. In the preferred embodiment, the spring member is a leaf spring. Additionally, the circular saw includes an adjustable shoe plate which changes the direction of impact of the blade guard on the spring member. The spring member absorbs the rotational force each adjusted direction. Also, the spring member and the blade guard are constructed of low friction materials so that movement of the blade guard against the spring member does not impede adjustment of the shoe plate of the circular saw.

10 Claims, 3 Drawing Sheets

BLADE GUARD STOP FOR A CIRCULAR SAW

BACKGROUND OF THE INVENTION

This invention relates to circular saws and, more particularly, to an improved blade guard stop for a circular saw.

A typical circular saw includes a housing having an operator's handle, an electric motor supported by the housing, a rotating saw blade driven by the motor, and a shoe plate supporting the circular saw against a workpiece. The housing forms a fixed blade guard covering the upper portion of the saw blade. The circular saw also includes a rotatable lower blade guard. The lower blade guard is rotatable about the saw blade axis, so that, during cutting operations, the lower blade guard is rotated to an uncovered or "non-surround" position via engagement with the workpiece. The lower blade guard is biased back to the covered or "surround" position by a coil spring and rotates until engaging a blade guard stop mounted on the housing. Typically, the blade guard stop includes a plastic or rubber grommet, washer or spacer supported by a suitable fastener mounted on the housing.

During the life of the circular saw, the typical blade guard stop is subjected to repeated impacts by the rotating lower blade guard. In order to withstand these repeated impacts, the fastener must usually be specially manufactured.

With a drop shoe or pivot shoe type of circular saw, the shoe plate is vertically and/or pivotally movable relative to the axis of the saw blade to adjust the depth of cut and the bevel angle of the circular saw. As the depth of cut or bevel angle of the circular saw is adjusted, the blade guard moves along the surface of the blade guard stop. Friction is created between the metallic blade guard and the plastic or rubber member of the blade guard stop. Additionally, when the circular saw is adjusted to a different depth of cut or bevel angle, the lower blade guard will impact the blade guard stop from a different direction.

SUMMARY OF THE INVENTION

One problem with the above-described blade guard stop assemblies is that the specially required components, such as the hardened fastener, are expensive. Also, even these special components wear and eventually fail due to the repeated impacts of the rotating blade guard. Another problem is that friction is created between the metallic blade guard and the plastic member of the existing blade guard stop. This friction can impede vertical and/or pivotal adjustment of the shoe relative to the saw blade. An additional problem is that the existing blade guard stop is not suited to absorbing impacts from several different directions as the shoe is adjusted.

The present invention provides an improved blade guard stop for a circular saw. The improved blade guard stop overcomes the problems of prior art blade guard stops. The invention provides an elongated flexible, impact absorbing blade guard stop member. In one embodiment, the blade guard stop member is a spring member and, specifically, is a leaf spring. In another embodiment, the blade guard stop member is formed of a low friction material, thus reducing the friction between the blade guard and the blade guard stop during adjustment of the circular saw. Additionally, the spring member absorbs the impact of the lower blade guard from several different directions, as is necessary in a drop shoe and/or pivot shoe circular saw.

An advantage of the blade guard stop of the present invention is that the blade guard stop is better able to withstand the repeated impacts by the lower blade guard over the life of the circular saw. This greatly increases the life of the blade guard stop and the life of the circular saw.

Another advantage of the blade guard stop is that it is inexpensive to manufacture.

Yet another advantage of the blade guard stop is that the reduced friction between the blade guard and the blade guard stop makes adjustment of the circular saw shoe easier.

Other features and advantages of the invention will become apparent to those skilled in the art upon review of the following detailed description, claims and drawings.

Figure 1:
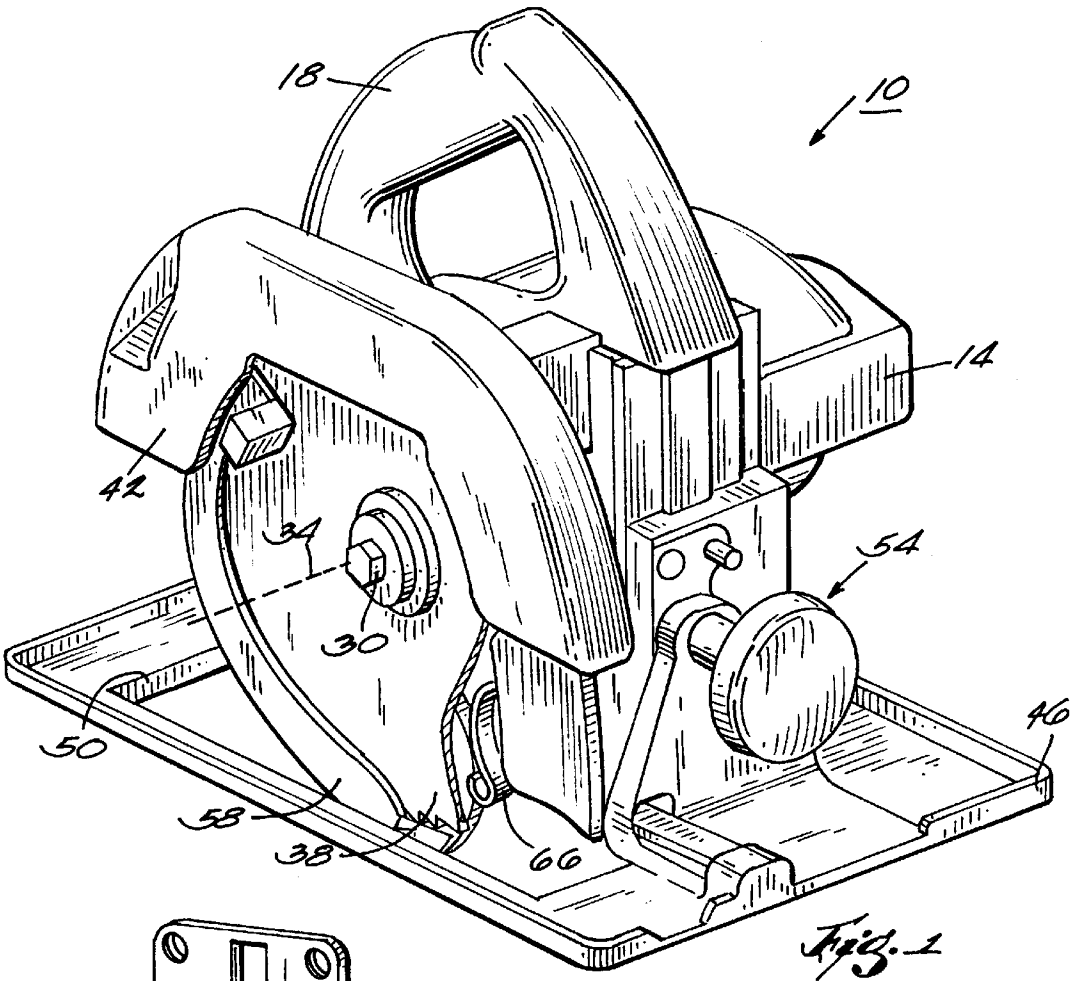
FIG. 1 is a perspective view of a circular saw embodying the invention.

Before one embodiment of the invention is explained in detail, it is to be understood that the invention is not limited in its application to the details of the construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting.

DETAILED DESCRIPTION OF THE PREFERRED EMBODIMENT

A circular saw 10 embodying the invention is illustrated in FIG. 1. The circular saw 10 includes a housing 14 having an operator's handle 18. An electric motor (not shown) is supported by the housing 14. As is commonly known in the art, the motor is selectively connected to a power source (not shown) by a switch (not shown). The motor drives a shaft 30 having a rotational axis 34. The circular saw 10 also includes a saw blade 38 supported on the drive shaft 30 and driven by the motor for rotation about the axis 34. A portion of the housing 14 serves as a fixed blade guard 42 covering the upper portion of the saw blade 38.

The housing 14 also includes a shoe plate 46 supported by the housing 14. The shoe plate 46 includes an opening 50 through which a portion of the saw blade 38 extends. The shoe plate 46 is adjustable relative to the housing 14 and relative to the axis 34 to vary the depth of cut (see FIGS. 4 and 5) and bevel angle of the saw blade 38. An adjustment mechanism 54 is operable to adjust the shoe plate 46, as described more fully below.

The circular saw 10 also includes (see FIG. 2) a rotatable lower blade guard 58. The blade guard 58 is supported by the housing 14 for rotation about the axis 34 and generally in a plane defined by the blade guard 58. The blade guard 58 is rotatable between a first or uncovered position (shown in phantom in FIG. 2), in which the lower portion of the saw blade 38 is exposed to cut a workpiece W, and a second or covered position (shown in solid lines in FIG. 2), in which the lower portion of the saw blade 38 is covered.

Figure 3:
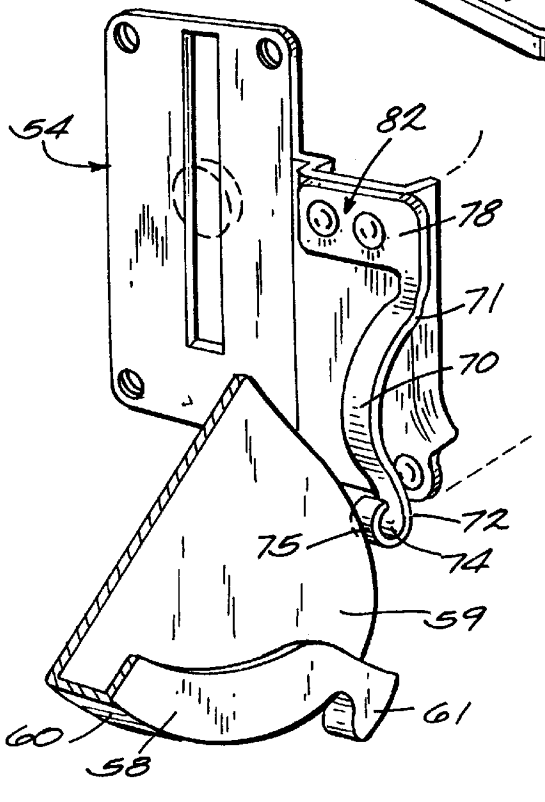
FIG. 3 is an enlarged, partial perspective view of the circular saw shown in FIG. 1 with portions cut-away to more clearly illustrate the blade guard stop.

The blade guard 58 includes (see FIG. 3) a planar portion 59 that is substantially parallel to the saw blade 38 and that defines the plane in which the blade guard 58 rotates. The blade guard 58 also includes an annular L-shaped portion 60 extending from the planar portion 59 and covering a portion of the teeth of the saw blade 38. A workpiece engaging portion 61 extends from the L-shaped portion 60 and is engageable with the workpiece W. The blade guard 58 is constructed of a low friction material such as aluminum.

The circular saw 10 also includes (see FIG. 2) a biasing member 62 connected to the blade guard 58. The biasing member 62 applies a biasing force to rotate the blade guard 58 toward the covered position. In the illustrated construction, the biasing member 62 is a spring connected between the housing 14 and the blade guard 58.

The circular saw 10 also includes (see FIG. 3) an elongated, flexible, impact absorbing spring member 66 supported by the housing 14. The spring member 66 absorbs the rotational force of the blade guard 58 as the blade guard 58 moves from the uncovered position (shown in phantom in FIG. 2) to the covered position (shown in solid lines in FIG. 2). The spring member 66 stops the blade guard 58 in the covered position and thereby prevents rotation of the blade guard 58 beyond the covered position. Whenever the blade guard 58 engages the spring member 66, the spring member 66 counteracts the biasing force of the biasing member 62.

The spring member 66 is (see FIG. 3) an integrally formed one-piece member and includes a body portion 70. The body portion 70 is elongated and flexible and includes upper and lower end portions 71 and 72. A flexible stop portion 74 extends from end portion 72. The stop portion 74 is generally rounded or circular and includes a smooth, arcuate engaging surface 75. Both the body portion 70 and the stop portion 74 flex to absorb the rotational force of the blade guard 58 and the biasing force of the biasing member 62.

The spring member 66 also includes a mounting portion 78 connected to the end portion 71. The mounting portion 78 is connected to the housing 14 in a suitable manner, such as by riveting, welding, or the use of screws, so that the spring member 66 is supported by the housing 14. In the illustrated construction, the mounting portion 78 is connected by rivets or fasteners 82 to the adjustment mechanism 54 of the shoe plate 46 so that the spring member 66 is movable with the shoe plate 46 when the shoe plate 46 is adjusted.

In the illustrated construction, the spring member 66 is a leaf spring and is constructed of a low friction material such as steel. Also, the spring member 66 is oriented so that the body portion 70 and the stop portion 74 are substantially in the rotational plane of the blade guard 58.

Figure 2:
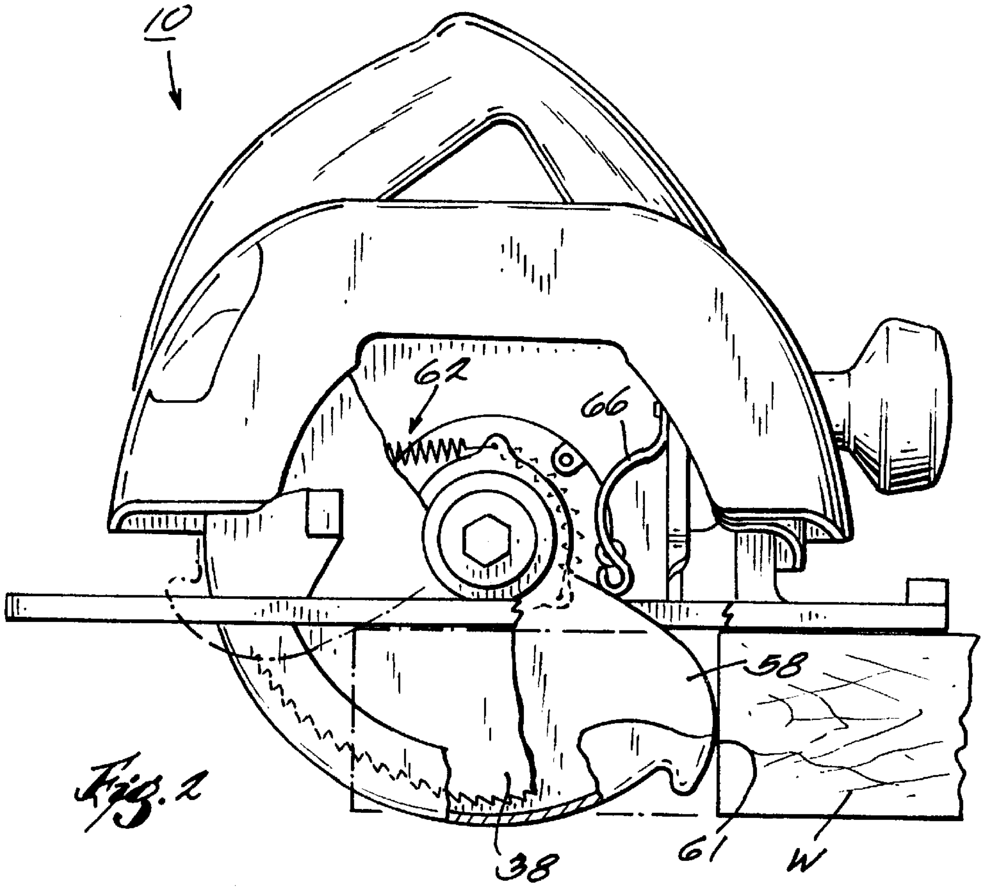
FIG. 2 is a side elevational view of the circular saw shown in FIG. 1 with portions cut-away.

In operation, the circular saw 10 is placed against the surface of the workpiece W. The operator engages the motor to drive the saw blade 38. As shown in FIG. 2 in the change of position from solid lines to phantom, as the operator moves the circular saw 10 across the surface of the workpiece W, the workpiece engaging portion 61 of the blade guard 58 engages an edge of the workpiece W, causing the blade guard 58 to rotate from the covered position to the uncovered position. The saw blade 38 is thus exposed as it cuts through the workpiece W. The force of the workpiece W on the blade guard 58 overcomes the biasing force of the biasing member 62 and causes the blade guard 58 to move to the uncovered position.

Once the operator has completed cutting the workpiece W and the workpiece engaging portion 61 of the blade guard 58 is no longer engaging the workpiece W, the biasing force of the biasing member 62 causes the blade guard 58 to rotate from the uncovered position to the covered position. As the blade guard 58 reaches the covered position, the engaging surface of the blade guard 58 impacts the engaging surface 75 of the spring member 66 causing the stop portion 74 and the body portion 70 to flex and absorb the impact of the blade guard 58 and to absorb the biasing force of the biasing member 62. Once the rotational force of the blade guard 58 has been absorbed, the body portion 70 and the stop portion 74 continue to apply a constant biasing force to the blade guard 58 to counteract the biasing force of the biasing member 62.

Figure 4:
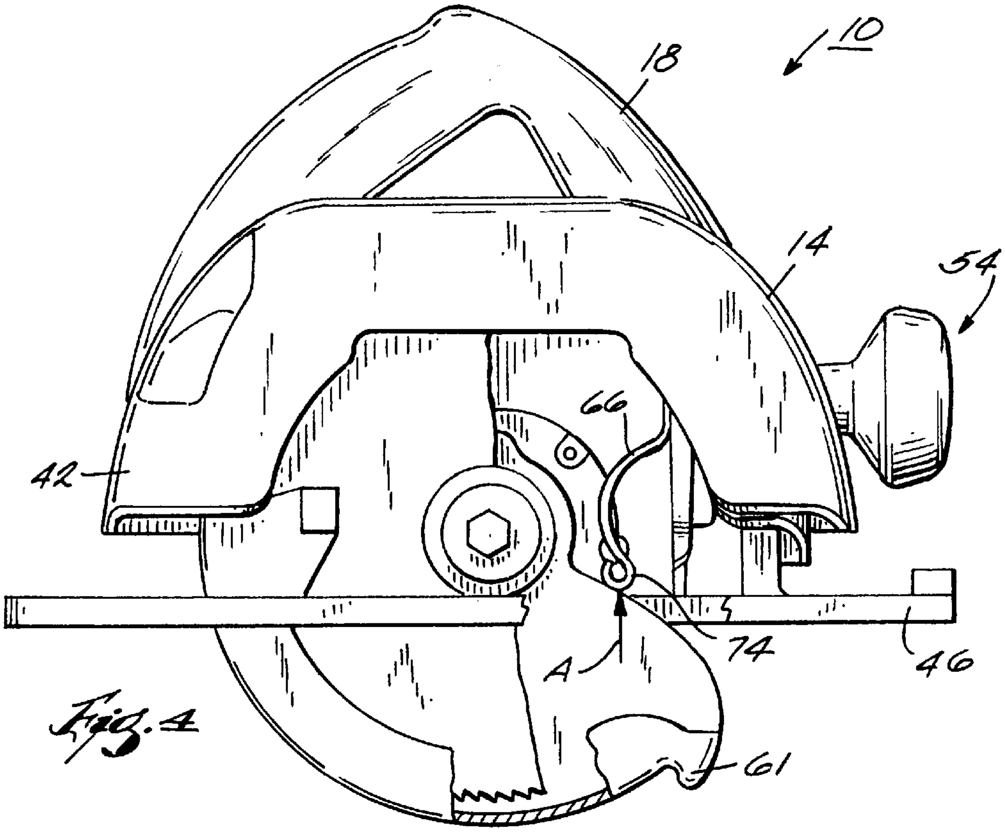
FIG. 4 is a side elevational view of the circular saw and the blade guard stop, showing the shoe adjusted for a maximum depth of cut.
Figure 5:
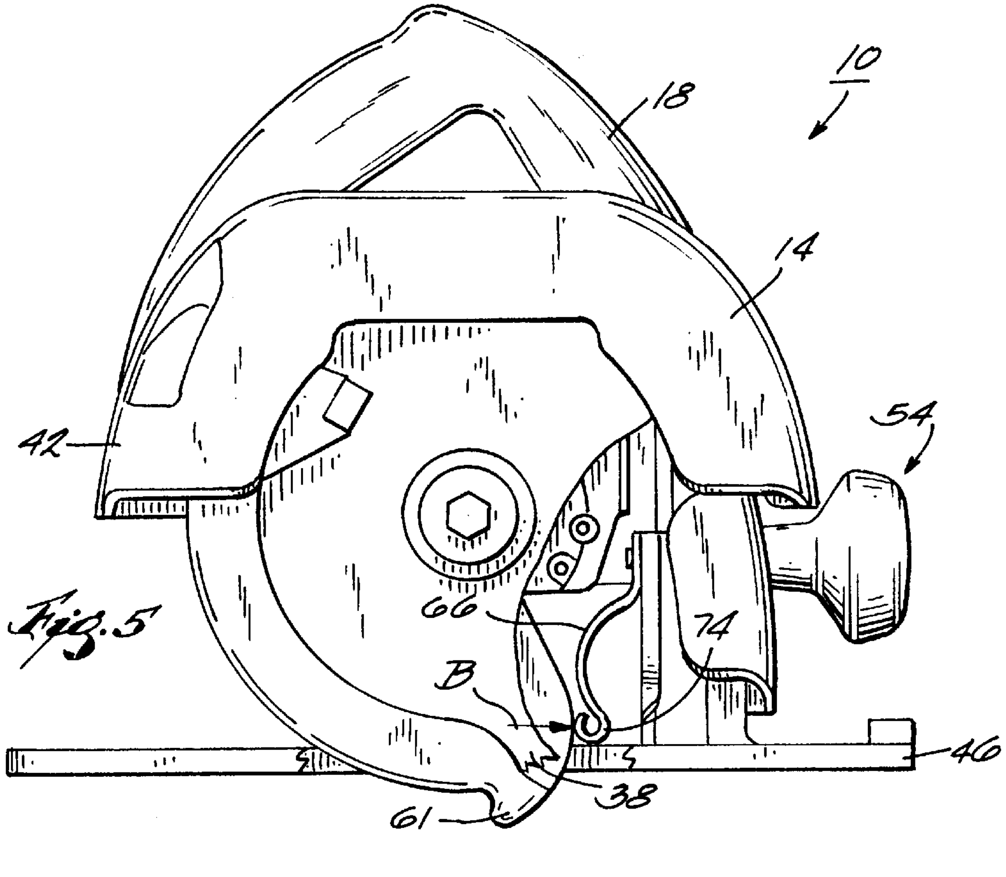
FIG. 5 is a side elevational view of the circular saw and the blade guard stop, showing the shoe adjusted to a minimum depth of cut.

As shown in FIGS. 4 and 5, the illustrated circular saw 10 is a drop shoe and pivot shoe circular saw. The shoe plate 46 is adjustable relative to the housing 14 and relative to the saw blade 38 to adjust the cutting depth of the saw blade 38 and the bevel angle of the saw blade 38. Normally, the shoe plate 46 is adjusted when the blade guard 58 is in the covered position contacting the spring member 66. As the shoe plate 46 is adjusted, the blade guard 58 moves against the surface of the stop portion 74. Because the blade guard 58 and the spring member 66 are constructed of a low friction material, friction between the blade guard 58 and the spring member 66 is greatly reduced.

As shown in FIGS. 4 and 5, the shoe plate 46 is adjustable to change the depth of cut of the saw blade 38. As shown in FIG. 4, with the shoe plate 46 adjusted to a first depth position, in this case a maximum depth of cut for the saw blade 38, the blade guard 58 engages a first portion of the spring member 66 in a first direction having a generally upward or vertical vector component, illustrated by arrow "A". As shown in FIG. 5, with the shoe plate 46 adjusted to second depth position, in this case a minimum depth of cut for the saw blade 38, the blade guard 58 engages a second portion of the spring member 66 in a second direction having a generally horizontal vector component, illustrated by arrow "B". With the blade guard 58 in any intermediate position between the maximum depth of cut position (shown in FIG. 4) or the minimum depth of cut position (shown in FIG. 5), the blade guard 58 engages another portion of the spring member 66 in a direction having a vector component that is between horizontal and vertical. This vector component depends on the position of the shoe plate 46 and the curvature of the engaging surface of the blade guard 58. Regardless of the position, the spring member 66 absorbs the rotational force of the blade guard 58 and the biasing force of the biasing member 62 from both the first direction and the second direction.

In comparison testing conducted between the above-described prior art blade guard stop and the spring member 66 of the present invention, it was found that the spring member 66 has a useful life that is approximately four times the useful life of the prior art blade guard stop member.

As shown in Table 1, on average, the prior art blade guard stop member assembly failed after approximately 84,600 cycles or impacts by a rotatable lower blade guard. Because the prior art blade guard stop experiences two failures (the rubber bumper and the fastener each fail), the mean time between failure of a component of the prior art blade guard stop member is approximately 42,300 cycles.

In comparison, as shown in Table 2, on average, the spring member 66 did not fail until more than 332,700 impacts by the blade guard 58.

TABLE 1

| Prior Art Blade Guard Stop Member | Rubber Bumper Cracking (cycles) | Rubber Bumper Failure (cycles) | Fastener Failure (cycles) |
|---|---|---|---|
| #1 | 7,200 | 21,600 | 72,000 |
| #2 | 12,600 | 39,600 | 97,200 |
| Average | 9,900 | 30,600 | 84,600 |
| Mean Time Between Failure | | | 42,300 |

TABLE 2

| Spring Member | Failure (cycles) |
|---|---|
| #1 | 332,100 (no failure) |
| #2 | 302,400 (spring failure) |
| #3 | 363,600 (no failure) |
| Average and Mean Time Between Failure | 332,700 |

Various features of the invention are set forth in the following claims.

We claim:

1. A circular saw including a housing, a motor supported by the housing, a saw blade driven by the motor for rotation about an axis, the saw blade having an upper portion and a lower portion, a portion of the housing covering the upper portion of the saw blade, the housing including a shoe movable relative to the saw blade to adjust the depth of cut of the saw blade, said circular saw comprising:

a blade guard supported by the housing for rotation about the axis, the blade guard being rotatable between a first position, in which the lower portion of the saw blade is exposed, and a second position, in which the lower portion of the saw blade is covered, said blade guard being constructed of a low friction material;

a biasing member between the housing and said blade guard, said biasing member biasing said blade guard toward said second position; and a spring member mounted on the shoe, said spring member engageable by said blade guard to stop rotation of said blade guard at said second position, said spring member absorbing the biasing force of said biasing member as said blade guard moves from said first position to said second position, said spring member being constructed of a low friction material, wherein the shoe is adjustable between a first depth position, in which said blade guard impacts a first portion of said spring member from a first direction, and a second depth position, in which said blade guard impacts a second portion of said spring member from a second direction, wherein said first and second portions of said spring member absorbs the biasing force of said biasing member as said blade guard rotates to said second position in said first and second directions, respectively, and wherein engagement of said blade guard and said spring member does not substantially impede adjustment of the shoe between the first and second depth positions.

2. A circular saw including a housing, a motor supported by the housing, and a saw blade driven by the motor for rotation about an axis, the saw blade having an upper portion and a lower portion, a portion of the housing covering the upper portion of the saw blade, said circular saw comprising:

a blade guard for selectively covering the lower portion of the saw blade, said blade guard being rotatably supported on the housing and being movable between a first position, in which the lower portion of the saw blade is exposed to cut a workpiece, and a second position, in which the lower portion of the saw blade is covered;

a biasing member connected to said blade guard to bias said blade guard from said first position to said second position; and a flexible, impact absorbing spring, said spring having opposite ends, one end connected to said housing, said spring having a movable portion supported by said one end and engaged by said blade guard.

3. The circular saw as set forth in claim 2 wherein said spring stops said blade guard at said second position and thereby prevents movement of said blade guard beyond said second position.

4. The circular saw as set forth in claim 2 wherein said spring is a leaf spring.

5. The circular saw as set forth in claim 2 wherein said spring is constructed of a low friction material.

6. The circular saw as set forth in claim 2 wherein the housing includes a shoe movable relative to the saw blade to adjust the depth of cut of the saw blade, and wherein said spring is mounted on the shoe.

7. The circular saw as set forth in claim 6 wherein the shoe is adjustable between a first depth position, in which said blade guard engages a first portion of said spring, and a second depth position, in which said blade guard engages a second portion of said spring from a second direction, and wherein said spring absorbs the rotational force of said blade guard from said first and second portions.

8. The circular saw as set forth in claim 7 wherein said spring has a body portion, wherein said blade guard engages said first portion of said spring from a first direction, wherein said blade guard engages said second portion of said spring from said second direction, and wherein said body portion is curved with a component in said first direction and a component in said second direction.

9. The circular saw as set forth in claim 2 wherein said spring has a body portion and a stop portion engaging said blade guard when said blade guard is in said second position, and wherein said body portion and said stop portion are each flexible and absorb the rotational force of said blade guard.

10. The circular saw as set forth in claim 2 wherein, when said blade guard is in said second position, said spring exerts a biasing force on said blade guard against the biasing force of said biasing member.

* * * * *